(12) United States Patent
Deluca et al.

(10) Patent No.: US 10,592,782 B2
(45) Date of Patent: Mar. 17, 2020

(54) IMAGE ANALYSIS ENHANCED RELATED ITEM DECISION

(71) Applicant: International Business Machines Corporation, Armonk, NY (US)

(72) Inventors: Lisa Seacat Deluca, Baltimore, MD (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 15/876,357

(22) Filed: Jan. 22, 2018

(65) Prior Publication Data

US 2019/0228270 A1    Jul. 25, 2019

(51) Int. Cl.

| G06K 9/00 | (2006.01) |
|---|---|
| G06K 9/62 | (2006.01) |
| G06K 9/60 | (2006.01) |
| G06Q 30/00 | (2012.01) |
| G06F 7/00 | (2006.01) |
| G06F 17/27 | (2006.01) |
| G06Q 50/00 | (2012.01) |
| G06F 16/583 | (2019.01) |
| G06F 16/9535 | (2019.01) |
| G06N 3/08 | (2006.01) |

(52) U.S. Cl.
CPC ....... *G06K 9/6268* (2013.01); *G06F 16/5846* (2019.01); *G06F 16/9535* (2019.01); *G06F 17/2775* (2013.01); *G06K 9/6215* (2013.01); *G06Q 50/01* (2013.01); *G06N 3/08* (2013.01)

(58) Field of Classification Search
USPC .............. 382/224, 305, 100; 705/26.7, 27.1; 707/723
See application file for complete search history.

(56) References Cited

U.S. PATENT DOCUMENTS

| 7,657,100 | B2 * | 2/2010 | Gokturk | .................... | G06K 9/46 |
| | | | | | 382/209 |
| 8,352,465 | B1 * | 1/2013 | Jing | ........................ | G06F 16/54 |
| | | | | | 707/723 |
| 8,908,962 | B2 * | 12/2014 | Bhardwaj | .......... | G06Q 30/0643 |
| | | | | | 382/165 |
| 2008/0082426 | A1 * | 4/2008 | Gokturk | ............. | G06Q 30/0625 |
| | | | | | 705/26.62 |
| 2008/0144943 | A1 * | 6/2008 | Gokturk | ................... | G06K 9/46 |
| | | | | | 382/224 |

(Continued)

*Primary Examiner* — Kathleen Y Dulaney
(74) *Attorney, Agent, or Firm* — Isaac Gooshaw, Esq.; George S. Blasiak, Esq.; Heslin Rothenberg Farley & Mesiti P.C.

(57) ABSTRACT

Methods, computer program products, and systems are presented. The method computer program products, and systems can include, for instance: obtaining from a user one or more data queries; identifying a product of interest in response to the one or more data query; examining a plurality of product records to determine a set of related products that are related to the product of interest, wherein the examining includes performing image analysis to extract one or more product topic classifier from product image data representing one or more product; and providing one or more output in response to the examining.

17 Claims, 12 Drawing Sheets

(56) References Cited

U.S. PATENT DOCUMENTS

| | | | |
|---|---|---|---|
| 2008/0240492 A1* | 10/2008 | Ohira | G06K 9/4671 |
| | | | 382/100 |
| 2009/0094260 A1* | 4/2009 | Cheng | G06Q 30/02 |
| 2011/0150324 A1* | 6/2011 | Ngan | G06K 9/00704 |
| | | | 382/159 |
| 2012/0203671 A1* | 8/2012 | Sutter | G16H 40/20 |
| | | | 705/27.1 |
| 2013/0022275 A1* | 1/2013 | Inoue | G06Q 30/0282 |
| | | | 382/195 |
| 2013/0083999 A1* | 4/2013 | Bhardwaj | G06Q 30/0643 |
| | | | 382/165 |
| 2014/0321761 A1* | 10/2014 | Wang | G06K 9/00677 |
| | | | 382/218 |
| 2015/0086068 A1* | 3/2015 | Mulhearn | G06T 1/0021 |
| | | | 382/100 |
| 2016/0042251 A1* | 2/2016 | Cordova-Diba | G06T 5/00 |
| | | | 382/180 |
| 2016/0110794 A1* | 4/2016 | Hsiao | G06Q 30/0631 |
| | | | 705/26.7 |
| 2017/0177970 A1* | 6/2017 | Kitajima | G06K 9/4604 |

* cited by examiner

IMAGE ANALYSIS ENHANCED RELATED ITEM DECISION

BACKGROUND

Image analysis involves the extraction of meaningful information from images such as digital images and can include various digital image processing processes. Digital image processing processes can include processes for noise removal, edge sharpening, object recognition and image segmentation.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining from a user one or more data queries; identifying a product of interest in response to the one or more data query; examining a plurality of product records to determine a set of related products that are related to the product of interest, wherein the examining includes performing image analysis to extract one or more product topic classifier from product image data representing one or more product; and providing one or more output in response to the examining.

In another aspect, a computer program product can be provided. The computer program product can include a computer readable storage medium readable by one or more processing circuit and storing instructions for execution by one or more processor for performing a method. The method can include, for example: obtaining from a user one or more data queries; identifying a product of interest in response to the one or more data query; examining a plurality of product records to determine a set of related products that are related to the product of interest, wherein the examining includes performing image analysis to extract one or more product topic classifier from product image data representing one or more product; and providing one or more output in response to the examining.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining from a user one or more data queries; identifying a product of interest in response to the one or more data query; examining a plurality of product records to determine a set of related products that are related to the product of interest, wherein the examining includes performing image analysis to extract one or more product topic classifier from product image data representing one or more product; and providing one or more output in response to the examining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
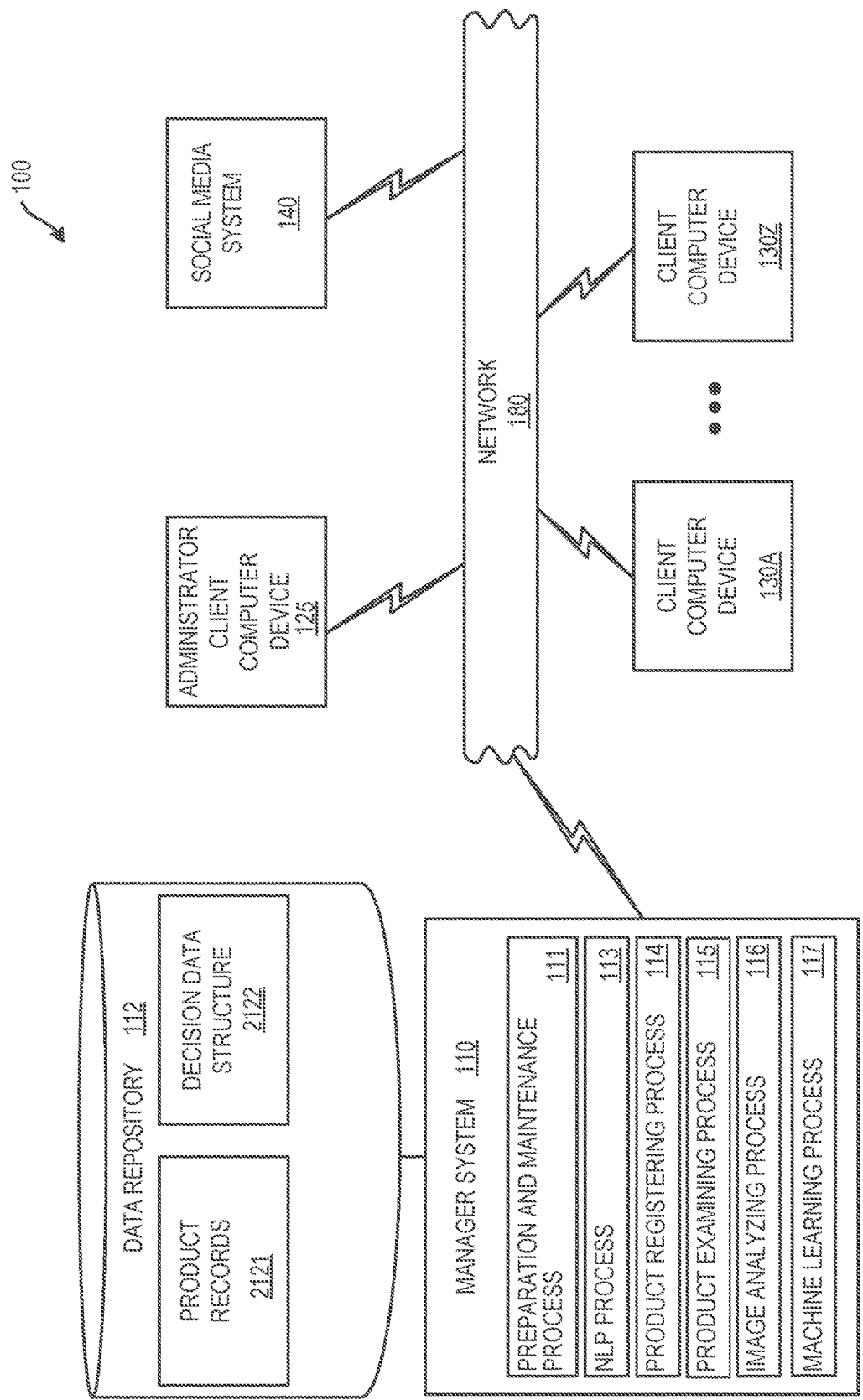
FIG. 1 depicts a system having a manager system, client computer devices, and an administrator client computer device according to one embodiment.

System 100 for use in supporting the generation of a recommendation is shown in FIG. 1. System 100 can include manager system 110 having an associated data repository 112, administrator client computer device 125, a plurality of client computer devices 130A-130Z, and social media system 140. Manager system 110, administrator client computer device 125, a plurality of client computer devices 130A-130Z, and social media system 140 can be in communication with one another via network 180. System 100 includes numerous devices, which may be computing node based devices, connected by a network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment manager system 110 can be external to client computer device 130A-130Z administrator client computer device 125 and social media system 140. In one embodiment manager system 110 can be co-located with one or more or client computer device 130A-130Z administrator client computer device 125 and social media system 140.

Each of the different client computer devices 130A-130Z can be associated to a different user. Regarding one or more client computer device 130A-130Z, a computer device of one or more client computer device 130A-130Z in one embodiment can be a computing node device provided by a client computer, e.g. a mobile device, e.g. a smartphone or tablet, a laptop, smartwatch or PC that runs one or more program, e.g. including a web browser for opening and viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment.

Manager system 110 can run various processes including preparation and maintenance process 111, Natural Language Processing (NLP) process 113, product registering process 114, product examining process 115, image analysis process 116, and machine learning process 117.

Data repository 112 can store various data, such as product records data for promotion of products and decision data structures for use in facilitating decisions by artificial intelligence (AI).

Manager system 110 running product registering process 114 can facilitate the registration of product records into data repository 112. When a new product is registered and can be made available for identification in response to one or more search query by a user who uses system 100 to identify products of interest. Manager system 110 running product registering process 114 can make available an administrator user interface for registration of products and an administrator user can use the administrator user interface to register new products. Such administrator user interface can include various data fields, e.g. allowing an administrator user to specify such information as a product name, product brand, product identifier, e.g. serial ID, a product image, product keywords, product specifications, product description, and/or a product sales price.

Manager system 110 running product examining process 115 can use image analysis for determining a set of related products that are related to a product of interest. Manager system 110 running product examining process 115 can run image analysis process 116. Manager system 110 running product examining process 115 can subject one or more image of one or more product to image analysis to extract topic classifications for one or more product image. Manager system 110 can use the extracted topic classification information as an input to a determination of a related set of products related to a product of interest. Manager system 110 running product examining process 115 can subject different types of product images to an image analysis for extraction of topic classifications. Manager system 110 running product examining process 115 can subject an image of a product of interest to image analysis for extraction of one or more topic classification. Manager system 110 running product examining process 115 alternatively or in addition to, can subject an image of a candidate related product for a product of interest to an image analysis for extraction of one or more topic classification of a candidate related product.

Manager system 110 running image analysis process 116 can subject product image data to image processing to return product topic classifiers with associated confidence levels and markup language content that specifies the topic classifiers and confidence levels.

Manager system 110, running machine learning process 117 can update one or more process run by manager system 110 based on obtained data to improve accuracy and/or reliability of the one or more process. In one embodiment, manager system 110 running product examining process 115 can use a decision data structure that maps product dissimilarity scores to decisions. Such a decision data structure can have parameter values, such as parameter values specifying decision thresholds and can be in dependence on a function having function parameter values such as a scoring parameter values for scoring product dissimilarities. Manager system 110 in one embodiment can run a plurality of instances of such a decision data structure, e.g. each instance for a different web-based session facilitating a product search. For each instance of the decision data structure, manager system 110 can vary such threshold value parameters and scoring value parameters within valid ranges.

Manager system 110 running machine learning process 117 can update the threshold value and/or function value parameters of the difference instances of the decision data structure. Manager system 110 can monitor performance of the difference instances and based on the performance monitoring can update the parameters of the decision data structures so that the parameters values over time converge toward values that are in common with decision data structures that are determined to the be best performing decision data structures according to one or more criterion.

Manager system 110 can run preparation and maintenance process 111 to populate and maintain data of data repository 112 for use by various processes run by manager system 110 including e.g. product examining process 115.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages, e.g. text based messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a)

topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Data repository 112 can store in product records area 2121 records of products available for identification as a product of interest. For each product in product records area 2121, there can be stored various data such as product name, brand name of a product, product identifier, e.g. product serial number, an image of a product, keywords associated to a product, specification of a product, a description of a product, and a price of a product. System 100 can be configured so that an administrator user can define data for inclusion in product records area 2121 using an administrator user interface. Embodiments herein facilitate updating data of product records area 2121 by machine learning. For example, decisions made by manager system 110 using topic classifications derived by image analysis can result in topic classifications being automatically appended to product record data.

Data repository 112 can store in decision data structures area 2122 one or more decision data structure for use in providing decisions based on image analysis derived topic classifications. In one embodiment, there can be stored in decision data structures area 2122 a machine logic artificial intelligence (AI) decision mapping knowledgebase that maps image analysis based product dissimilarity scores to decisions, wherein the decisions can involve including or not including a product in a determined set of related products. In one embodiment, system 100 can be configured so that one or more decision data structure of decision data structures area 2122 is automatically updated by machine learning. Products herein can include e.g., physical, tangible products or services products, e.g. entertainment event services products or professional services products, e.g. accounting services, advertising services, legal services, and the like.

Embodiments herein recognize that services for returning related products related to an identified product of interest can return erroneous information, based on search terms that have different meanings in different contexts. For example, a homograph is a term that has different meanings in different contexts, e.g. "bass", the type of fish or "bass", the type of musical instrument, or according to another example "bow" referring to a type of decorative ribbon or "bow" the apparatus for projecting an arrow. Embodiments herein recognize that numerous and more subtle examples of terms having different meanings in different contexts can occur with respect to descriptions of products. For example, the term "collar" can refer to a type of jewelry apparel, a portion of a shirt, or an apparatus for attachment to neck area of a domestic pet such as a dog. The term "can" may refer, e.g. to an apparatus for storage of food items or alternatively to an apparatus for disposal of refuse. The term "glasses" may refer, e.g. to drinking glasses or eyewear. Embodiments herein employ image analysis to distinguish between contexts wherein the same term has different meanings across different contexts in commonly used product description presentments.

Embodiments herein further recognize that it can be advantageous to simplify data entry tasks associated with registration of new products into a data repository storing product records. In fact, embodiments herein recognize that product records are often defined and uploaded on a rush basis with limited content associated with the records. Embodiments herein recognize that product records provided within limited text based data e.g. on a rush basis have an increased likelihood of problems that are addressed by combinations that are set forth herein.

Figure 2:
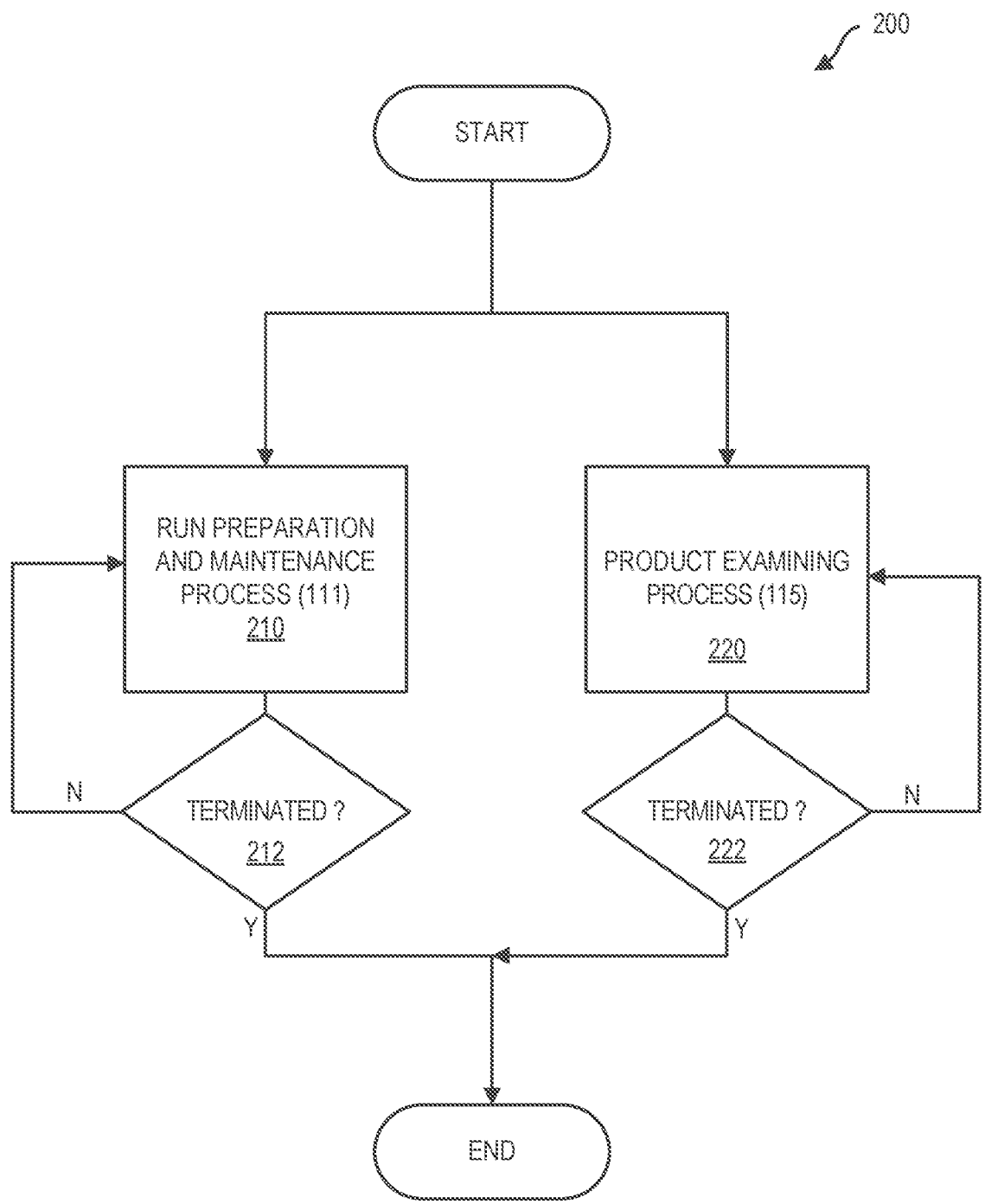
FIG. 2 is a flowchart illustrating a method for performance by a manager system according to one embodiment.

FIG. 2 depicts a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of locations areas 2121-2122. Manager system 110 can run preparation and maintenance process 111 iteratively until process 111 is terminated at block 212.

At block 220, manager system 110 can run product examining process 115 to determine related products related to one or more product of interest. For support of running of product examining process 115 iteratively, manager system 110 can be running e.g. NLP process 113, product registering process 114, product examining process 115, image analysis process 116 and machine learning process 117 iteratively. Manager system 110 can run product examining process 115 until product examining process 115 is terminated at block 222.

Figure 3:
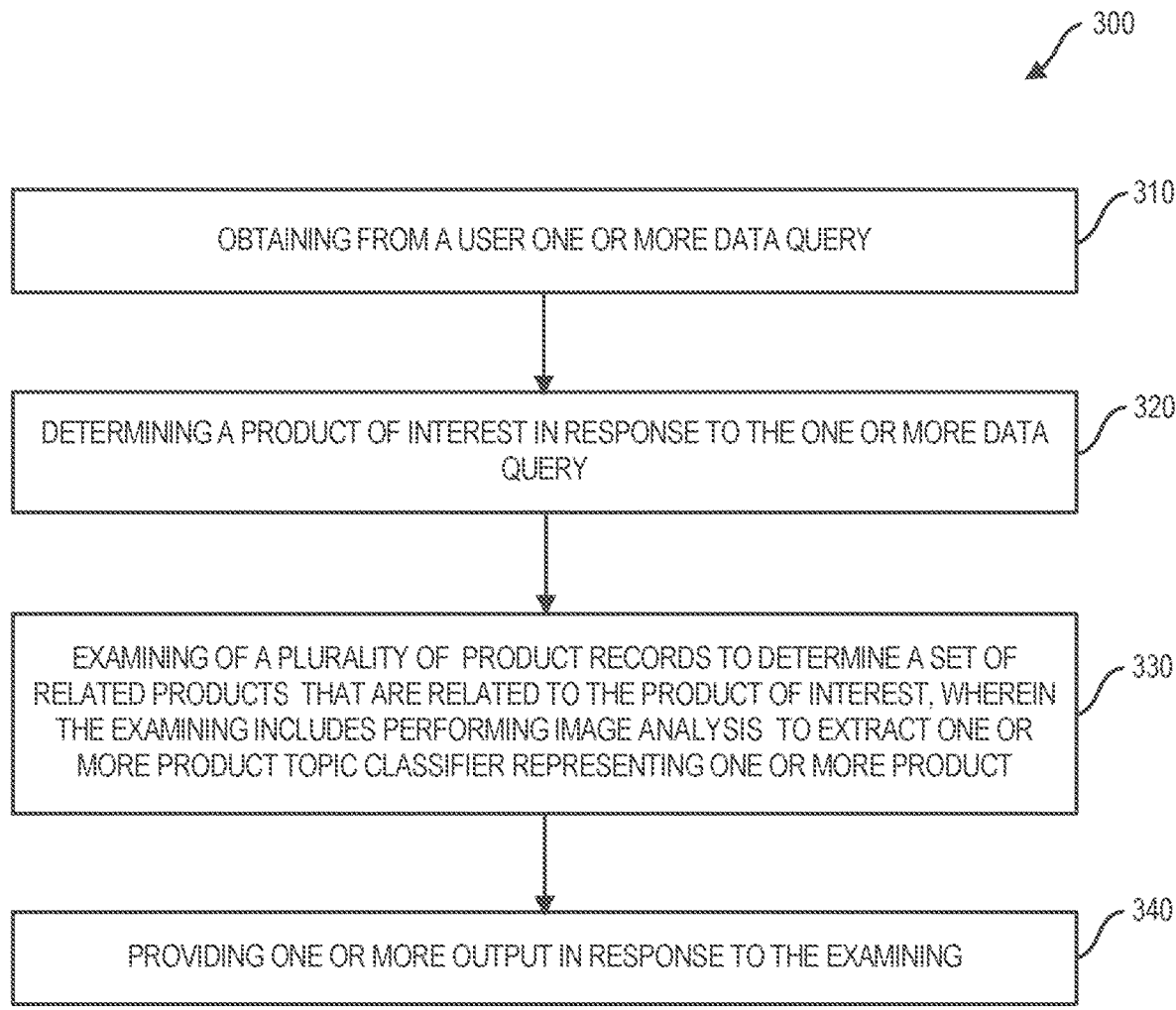
FIG. 3 is a flowchart illustrating a method for performance by a manager system according to one embodiment.

There is set forth herein in reference to FIG. 3, method 300 that can be performed by manager system 110 according to one embodiment. Manager system 110 at block 310 can perform obtaining from a user one or more data query. Manager system 110 at block 320 can perform identifying a product of interest in response to the one or more data query. Manager system 110 at block 330 can perform examining of a plurality of product records to determine a set of related products that are related to the product of interest, wherein the examining includes performing image analysis to extract one or more product topic classifications representing one or more product. Manager system 110 at block 340 can perform providing one or more output in response to the examining. The set of related products that are related to the product of interest determined at block 330 can include one or more related product.

Figure 4:
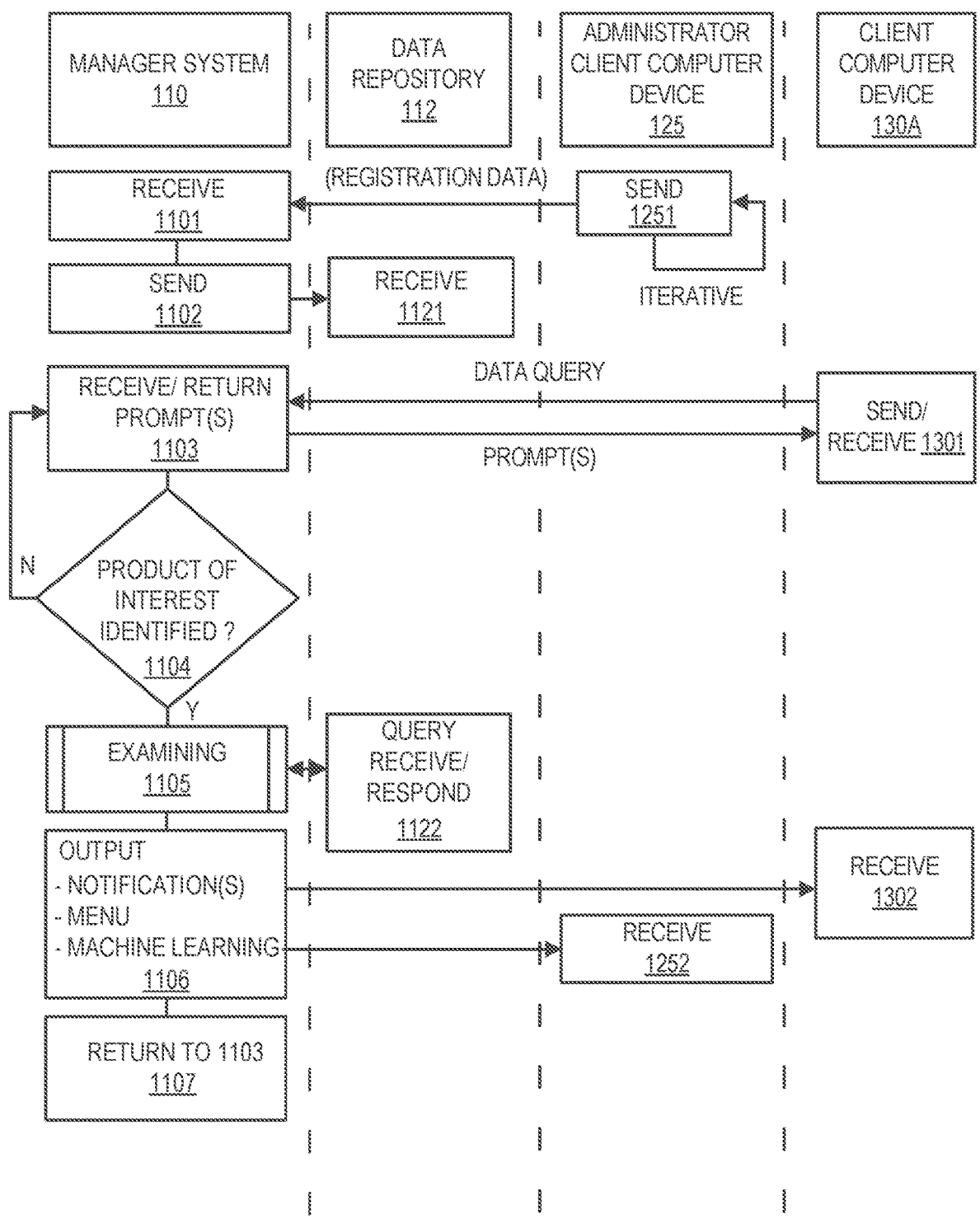
FIG. 4 is a flowchart illustrating a method for performance by a manager system interoperating with other components according to one embodiment.

A specific example of method 300 is set forth in reference to the flowchart of FIG. 4 illustrating a specific example of method 300 from the perspective of manager system 110 interacting with data repository 112 of manager system 110, administrator client computer device 125, and client computer device 130A.

At block 1251, administrator client computer device 125 can send product registration data to manager system 110 for receipt by manager system 110 at block 1101. Product registration data can include data for registration into product records area 2121 of data repository 112. For sending of product registration data at block 1251, an administrator user can use an administrator user interface such as administrator user interface 500 depicted in FIG. 5. Administrator user interface 500 can include various data entry areas such as data entry area 502 for specifying a product name, area 504 for specifying a product brand, area 506 for specifying a product identifier, e.g. a product serial number, area 508 for specifying an image depicting a product, area 510 for specifying keywords of a product, area 512 for entry of specification data of a product, area 514 for specifying a description of a product, and area 516 for specifying a price of a product. Referring to area 508 of administrator user interface 500, area 508 in one embodiment can permit an administrator user to select an image stored within a file directory accessible by an administrator user.

Administrator user interface 500 in one embodiment can be provided by a webpage form served by manager system 110. Administrator user interface 500 can be an administrator user interface for display on a display of administrator client computer device 125.

In one embodiment, administrator client computer device 125 is an administrator client computer device of an enterprise such as a retail enterprise that provides an online retail store. In another embodiment, system 100 can provide a retail store for access to products provided by multiple different entities which can include, e.g. corporate entities and/or sole proprietorships (e.g. individuals posting content in an online auction retail store environment). In one embodiment, system 100 presents an online retail store environment provided by a crowdsource online retail store auction environment, in which different enterprises, which can include, e.g. corporate business enterprises and individual users (e.g. sole proprietorships) can use administrator user interface 500 to define product records having content such as product name, product brand, product identifier (e.g. product serial number), an image of a product, product keywords, product specification, a product description, and/ or a product price indexed under the respective headings for data entry areas 502, 504, 506, 508, 510, 512, 514, and 516 of FIG. 5.

In response to receiving product registration data, manager system 110 at block 1102 can send received product registration data for receipt by data repository 112 at block 1121 for storage of product registration data into product records area 2121 of data repository 112. Contemporaneously with storing of registration data manager system 110 can activate NLP process 113 to return topic classifiers for text entered into one or more data entry areas 502, 504, 506, 510, 512, 514, and 516. Accordingly, product records of product records area can include product topic classifiers.

Each product for which data is stored in product records area 2121 can include the data entered using data entry areas 502, 504, 506, 508, 510, 512, 514, and 516. Thus, there can stored in a record for each product an image as well as textual data. In some embodiment, text entered into keywords area 510 of administrator user interface 500 can be subject to NLP processing by NLP process 113 to extract product topic classifiers based on the keywords. In some embodiments, keywords that are entered into keywords area 510 can be processed by system 110 as product topic classifiers, and extracted product classifiers extracted by processing performed by manager system can be added to keyword data stored for a product of product records area 2121 of data repository 112 indexed under the heading "keywords".

Manager system 110 can perform receipt of configuration data provided by product registration data at block 1101 on an iterative basis. That is, administrator client computer device 125 can iteratively send product registration data for receipt by manager system 110 at block 1101 on an iterative basis, e.g. as data for new products is entered by administrator user, using administrator user interface 500. Further it will be seen that in some instances a plurality of administrator users can be using different instances of administrator user interface 500 for entry of product registration data for sending at block 1251. The sending of product registration data at block 1251 and the receiving of product registration data at block 1101 can be performed iteratively throughout the lifetime of system 100, e.g. while instances of functions, such as functions described herein with respect to blocks 1103-1107 are being performed.

Client computer device 130A can perform sending and receiving at send/receive block 1301 and manager system 110 can perform receiving and returning prompts at receive/ return prompt block 1103. Blocks 1301 and 1103 refer according to one example, to a client server interactive web browsing session in which a client provided by client computer device 130A is used by a user to search for data relating to various products, data of which can be stored in product records area 2121 of data repository 112.

Figure 7:
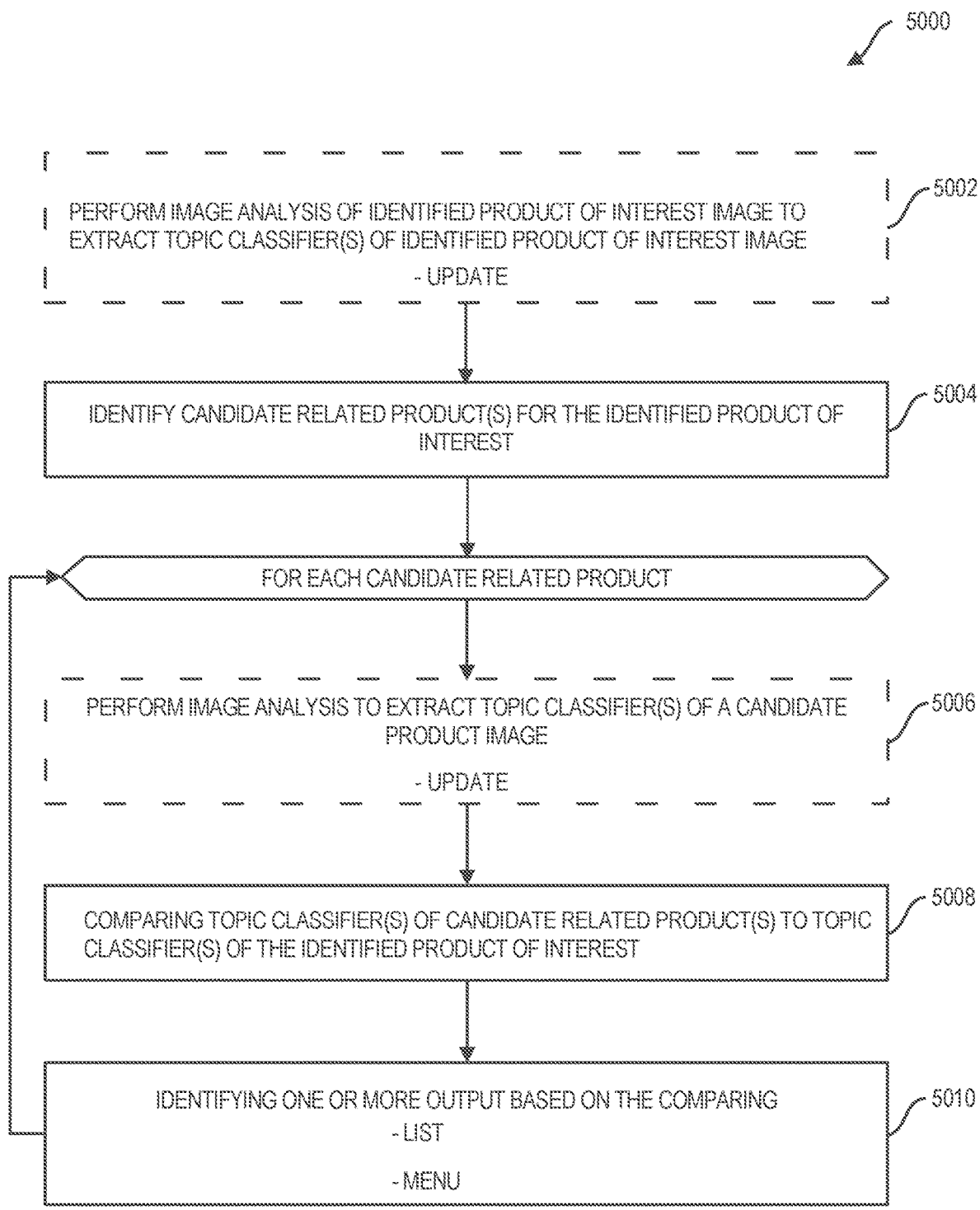
FIG. 7 is a flowchart illustrating a method for performance by a manager system according to one embodiment.

For example, a user can use a data entry area of user interface 1700 as shown in FIG. 7 to search for one or more product of interest. User interface 1700 can be displayed on a display of client computer device 130A and can be a manually operated user interface. Data which may be entered by a user into a data entry area, such as data entry area 1702 of user interface 1700 can include, e.g. a product serial number or descriptive terms describing a product. Based on entered text entered a data entry area 1702 by a user using user interface 1700, manager system 110 can identify one or more product of interest. On the identification of one or more product of interest, manager system 110 can display in area 1704 content specifying an identifies one or more product of interest. The content can include, e.g. an image depiction of the product of interest and/or a description of the product of interest. As indicated by blocks 1301 and 1103, a user may enter into data entry area 1702 one or more query and/or may interact with other active areas of user interface 1700 to specify one or more query prior to and based on such entered one or more query entered using user interface 1700. Manager system 110 can identify one or more product of interest and can responsively display content respecting the identified one or more product of interest in area 1704. In some use cases, manager system 110 can return a single identified product of interest in response to a single query, e.g. entered into data entry area 1702 of user interface 1700. For example, the user can enter a product serial number and a single product of interest can be identified based on the entered serial number. In other use cases, as indicated by block 1301 (specified to be iterative) and block 1103, a user can use different areas of user interface 1700 to specify a succession of queries, e.g., in response to different prompts returned by manager system 110 prior to manager system 110 finally identifying one or more product of interest and displaying content respecting the identified one or more product of interest in area 1704.

Manager system 110 at block 1104 can determine whether or not a product of interest has been identified. If a product of interest has not been identified, manager system 110 at block 1104 can iteratively return to block 1103 to iteratively send an additional one or more prompt to client computer device 130A, prompting a user e.g. with menu options until sufficient data is received from client computer device 130A facilitating the identification of one or more product of interest by manager system 110. On determination that a product of interest has been identified at block 1104, manager system 110 can proceed to block 1105 to perform examining of a plurality of product records of product records area 2121 to determine a set of related products that are related to the product of interest identified by manager system 110, wherein the examining includes performing image analysis, e.g. by activating image analysis process 116 to extract one or more product topic classifier representing one or more product. Performing examining by manager system 110 at block 1105 can include multiple queries of data repository 112 as indicated by query receive/response block 1122 performed by data repository 112.

Function of manager system 110 performing examining at block 1105 according to one embodiment is described with reference to process 5000 set forth in reference to the flowchart of FIG. 7. At block 5002, manager system 110 can activate image analysis process 116 to perform image analysis of an identified product of interest image to extract topic classifier(s) of the identified product of interest image. At block 5004, manager system 110 can perform identifying candidate related products of the identified product of interest and for each candidate related product of interest, manager system 110 can perform blocks 5006, 5008, and 5010. At block 5006, manager system 110 can perform image analysis to extract classifier(s) of a candidate product image. At block 5008, manager system 110 can perform comparing topic classifier(s) of a candidate related product(s) to topic classifier(s) of the identified product of interest. At block 5010, manager system 110 can perform identifying one or more output based on the comparing performed at block 5008.

Referring to block 5002, manager system 110 can activate image analysis process 116 to return topic classifiers of an image specifying a product of interest. For example, referring to user interface 1700, an image of a product of interest can be provided by the displayed image in area 1704 specifying content of an identified product of interest. The image displayed in area 1704 can be an image previously specified by an administrator user using user interface 500 described in FIG. 5. In one embodiment, an image analysis service can be provided by IBM Watson® Visual Recognition Services (IBM Watson is a registered trademark of International Business Machines Corporation).

Figure 8:
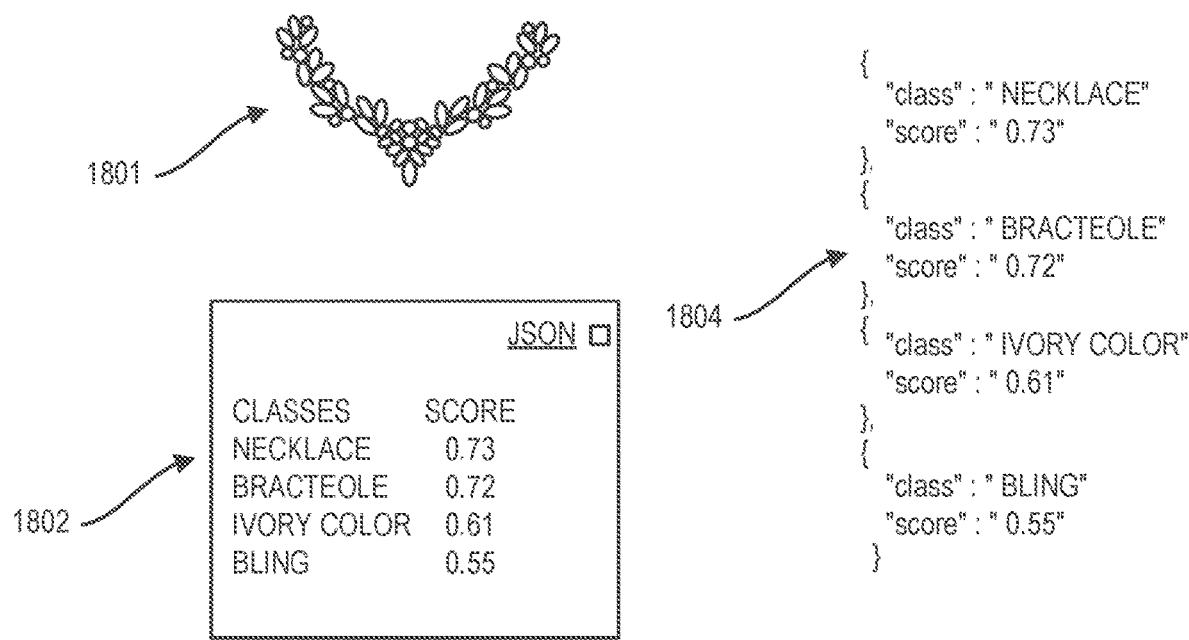
FIG. 8 depicts content that can be returned by subjecting a product of interest image to image analysis according to one embodiment.

Illustrative content that can be returned by manager system 110 running image analyzing process 116 in respect to an identified product of interest image is described in reference to FIG. 8. The return content can include as indicated by content 1802, topic classifications for the analyzed product image and associated confidence scores with each classification. In the example described in reference to FIG. 8, manager system 110 can return for analyzed image 1801, the following classifications: necklace (confidence score 0.73), brachteole (confidence score 0.72), ivory color (confidence score 0.61), and bling (confidence score 0.55). Manager system 110 can further return markup language content specifying the various classifications and confidence levels. More specifically, content 1804 can include markup language text and syntax processable by process interfaces that specify the topic classifications and associated confidence levels of content 1802.

Referring to block 5004, manager system 110 can perform identifying candidate related products for an identified product of interest using text based topic matching processes wherein text entered or menu selection specified by a user is used to determine topics that matched to topics of records of product records area 2121. For example, manager system 110 can match topics derived using text entered or specified by a user to topics derived by text of product records area 2121 corresponding to text entered into one or more of area 502, area 504, area 506, area 510, area 512, area 514 of administrator user interface 500 depicted in FIG. 5. Embodiments herein however recognize that such text derived topic matching can return erroneous results for reasons set forth herein, e.g. that a common descriptive term can have different meanings across different contexts and that the problem can be heightened when limited text data is entered e.g. on a rush basis into an administrator user interface having characteristics as shown in reference to administrator user interface 500 of FIG. 5.

Figure 6:
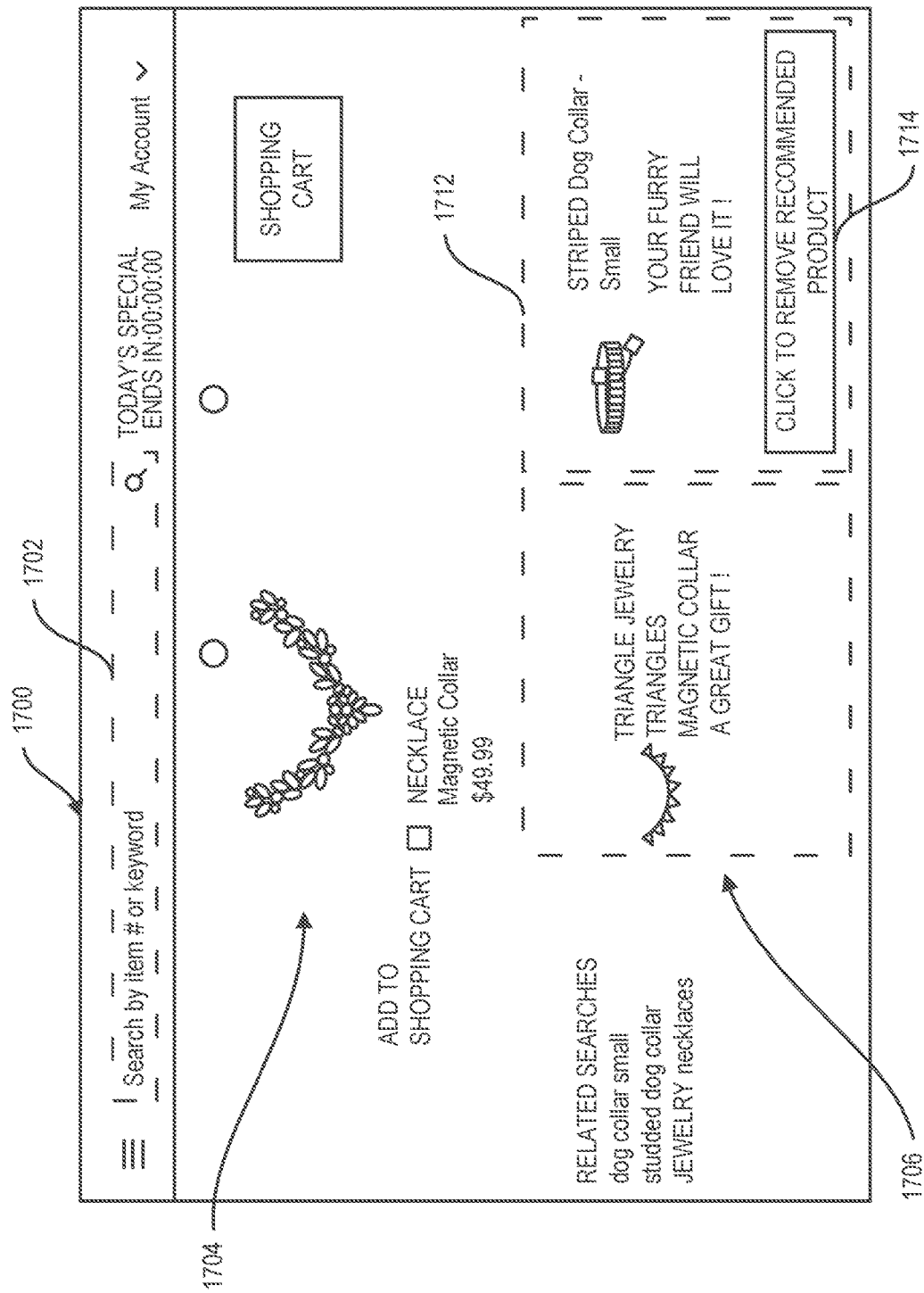
FIG. 6 depicts a user interface facilitating searching for a product of interest by a user according to one embodiment.

In the described example described with reference to user interface 1700, illustrated in reference to FIG. 6, determined related products determined to be related to a product of interest can be displayed in area 1706 can include products that are potentially unrelated to the product of interest. In the described example based on the descriptive term "magnetic collar" which refers to an article of jewelry determined related products displayed in area 1706 can include jewelry collars and can also include pet collars. Embodiments herein provide featurizations that can suppress based on image analysis certain products from a determined related products list defined by a determined set of related products. Referring further to the flowchart of FIG. 7, manager system 110 with candidate related products for an identified product of interest identified at block 5004 can proceed to block 5006 to perform image analysis to extract topic classifier(s) of a candidate product image.

At block 5006 manager system 110 for each identified candidate related product identified at block 5004 can perform image analysis on an image of the candidate product to return various information such as one or more topic classification of the candidate product image together with confidence level information as well as markup language content. In the described example described with reference to user interface 1700 set forth in FIG. 6, manager system 110 can identify the product described as "striped dog collar" as a candidate product related to an identified product of interest.

Figure 9:
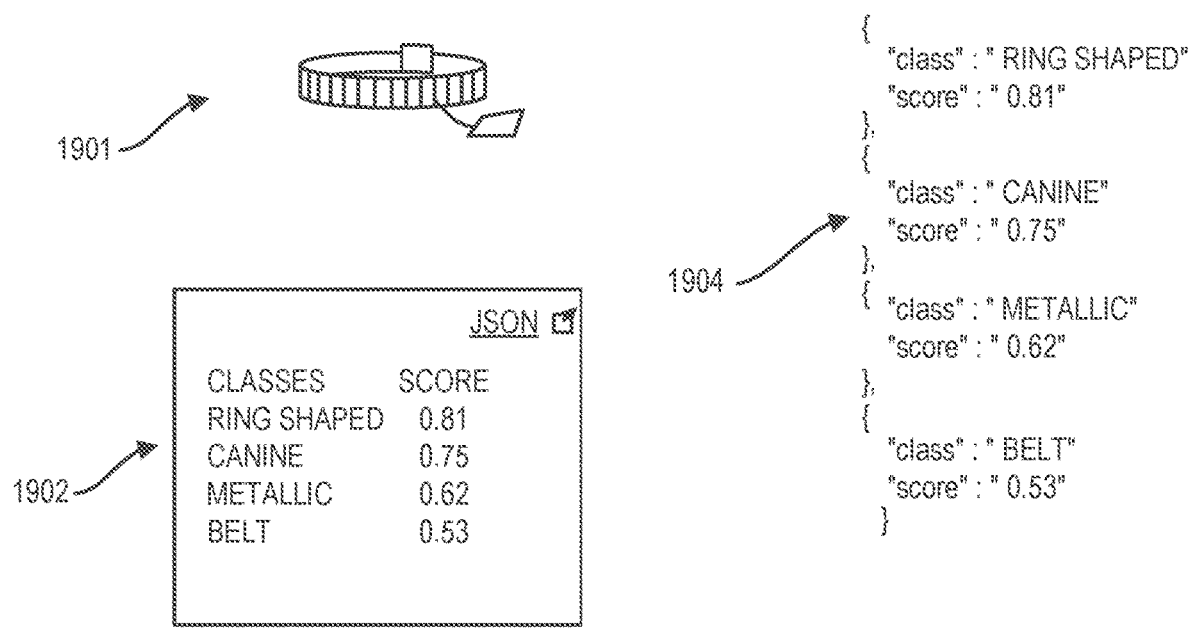
FIG. 9 depicts content that can be returned by subjecting a candidate related product image to image analysis according to one embodiment.

FIG. 9 depicts illustrative content that can be returned by manager system 110 by subjecting an image of such a candidate related product to image analysis. Returned content can include classification content 1902 specifying topic classifications and confidence levels associated with the various topic classifications for an analyzed image such as image content 1901 specifying the identified candidate related product. Classification content 1902 can include various classifications such as the topic classifications as follows: ring shaped (confidence level 0.81), canine (confidence level 0.75), metallic (confidence level 0.62), and belt (confidence level 0.53). Returned content returned as a result of subjecting an image of a candidate related product to image analysis can include markup language content 1904 which can include markup language text and syntax specifying the various topic classifications and confidence levels of image content 1901 to facilitate processing by a downstream one or more process interface.

Figure 5:
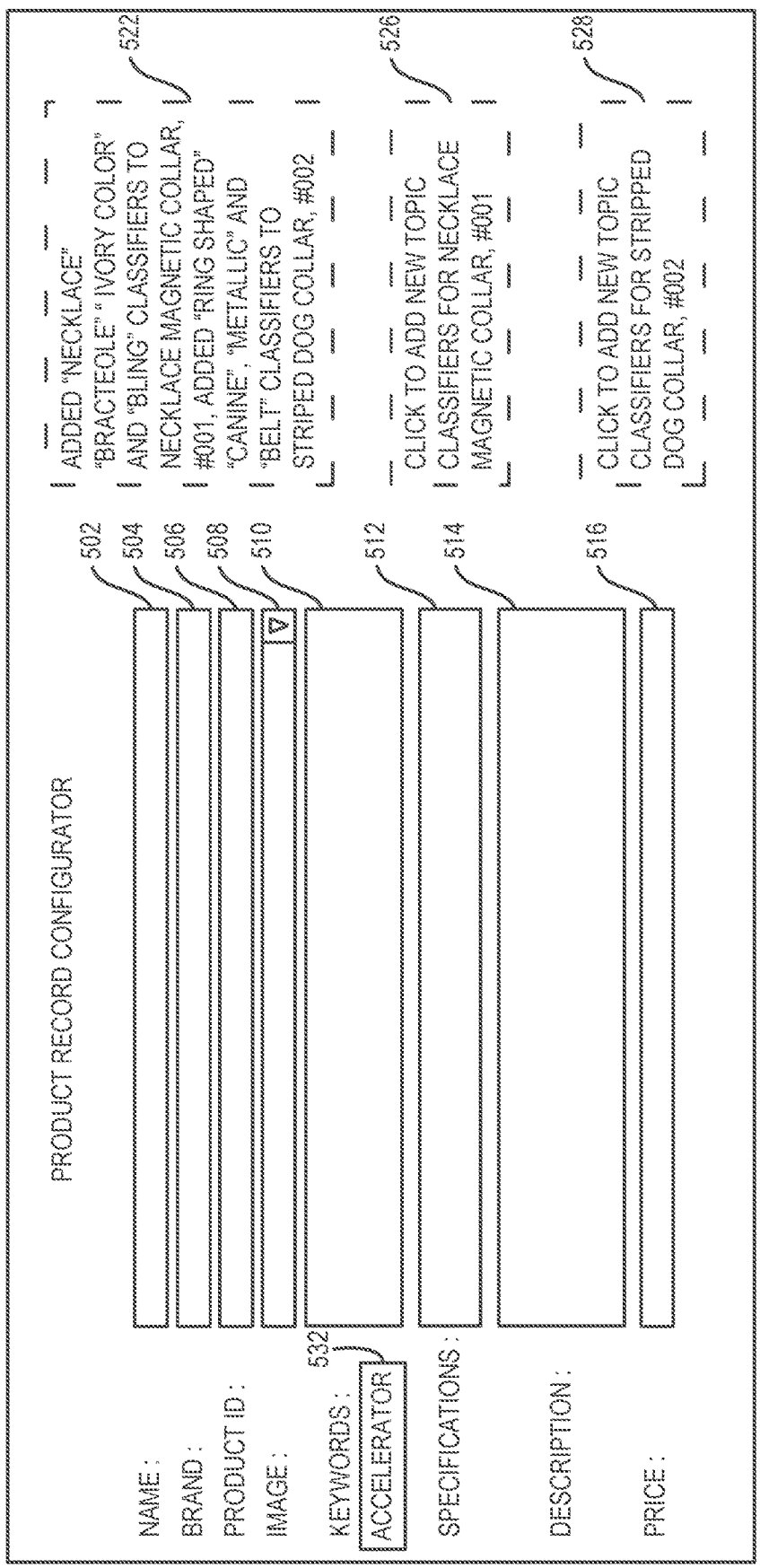
FIG. 5 depicts an administrator user interface according to one embodiment.

Referring to comparing block 5008 manager system 110 can perform comparing topic classifiers of an identified product of interest to topic classifiers of identified candidate related products related to topic classifiers. For performing comparing at block 5008, manager system 110 can use topic classifications extracted as a result of image analysis at blocks 5002 and 5006 and/or manager system 110 can use preexisting topic classifiers from product records area 2121, which topic classifiers can be specified by a user, e.g. by specifying keywords in keyword area 510 of user interface 500 as shown in FIG. 5 and/or as may be determined by manager system 110 by subjecting text entered into one or more of area 502, 504, 506, 510, 512, 514 to processing by NLP process 113 to determine topic classifications of such entered text. Whether or not preexisting topic classifiers are used at block 5008, manager system 110 in performing comparing at block 5008 can perform comparing in dependence on topic classifications returned as a result of image analysis at block 5002 and/or block 5006. In one embodiment, block 5002 can be deleted and manager system 110 can perform comparing at block 5008 by comparing preexisting topic classifiers of product records area 2121 to topic classifiers including topic classifiers of a candidate related product including topic classifiers returned by image analysis respecting a candidate product image at block 5006. In one embodiment, block 5006 can be deleted and comparing at block 5008 can include comparing of product of interest topic classifiers including topic classifiers returned as a result of image analysis at block 5002 to topic classifiers of identified candidate products of interest, wherein the topic classifiers of the candidate products of interest are preexisting topic classifiers of product records area 2121.

In one embodiment, comparing by manager system 110 at block 5008 can include manager system 110 performing dissimilarity scoring processing. Manager system 110 performing comparing at block 5008 in one embodiment can include manager system 110 using Eq. 1 as follows.

$$DS = F_1 W_1 - F_2 W_2 \quad \text{(Eq. 1)}$$

Where DS is a dissimilarity score between an identified product of interest and an identified candidate related product, where $F_1$ is a topic match failure factor, $F_2$ is a topic match success factor, and where $W_1$ and $W_2$ are weights, respectively, associated with factors $F_1$ and $F_2$.

Manager system 110 for comparing an identified product of interest to an identified candidate related product can compare topic classifications for the identified product of interest to topic classifications for the identified candidate related product. Where manager system 110 finds no match for a topic classification of an identified product of interest, manager system can increment by one a topic match failure accumulator. Where manager system 110 identifies a match between a topic classification of an identified product of interest and a candidate related product, manager system 110 can increment by one a topic match success accumulator. In one embodiment, the factor $F_1$ can be provided as a percentage of attempted matches resulting in topic match failures and $F_2$ can be provided as a percentage of attempted topic matches resulting in topic matching successes. In one embodiment, these values can be scaled according to confidence levels associated with various topic classifications. For example, matching between topics having respective 0.80 and 0.70 confidence levels can increment a topic matching accumulator by 0.75 (the average of 0.80 and 0.75) rather than 1.0. Based on Eq. 1, it can be seen that a relatively high dissimilarity score (DS) can be provided when there are several topic classification matching failures and few topic classification matching successes and that a relatively low dissimilarity score (DS) can be provided when there is a high percentage of topic matching attempts that are topic matching successes.

At block 5010, manager system 110 can perform identifying of one or more output based on comparing performed at block 5008. The identifying one or more output at block 5010 can include, e.g. identifying a determined set of one or more related products for presentment of a notification to a user and/or determined menu options, e.g. for presentment to an administrator user and/or to a user performing a search for return of an identified product of interest. Manager system 110 performing identifying one or more output at block 5010 can include manager system 110 using one or more decision data structure of decision data structures area 2122.

Referring to blocks 5008 and 5010, manager system 110 can perform identifying one or more output based on a comparing using a decision data structure of decision data structures area 2122 in accordance with the decision data structure set forth in reference to Table 1, which maps various dissimilarity scores (DS) to various decisions, e.g. A, B, C, D, E and F that specify various actions by manager system 110.

TABLE 1

| Dissimilarity Score (DS) | Decision |
| --- | --- |
| DS ≥ $T_1$ | A: Auto-suppress candidate related product from a set of related products for display on user interface 1700; <br> B: Auto-update all product topic classification lists for all products (product of interest or candidate related products) subject to image analysis; <br> C: Notification to administrator user specifying suppression and update of topic classification lists. |
| $T_1$ > DS ≥ $T_2$ | D: Present menu option to user to suppress candidate related product; <br> E: Present notification and menu option to administrator user to add image analysis extracted product topic classifiers to product topic classifier lists (product of interest or candidate related product) subject to image analysis. |
| DS < $T_2$ | No suppression of candidate related product from set of determined related products; no update of product topic classifier lists to include image analysis determined topic classifiers; <br> F: Present administrator user notification and menu option to add image analysis determined product topic classifiers to product topic classifier lists in an alternative embodiment. |

As set forth in reference to the decision data structure of Table 1, manager system 110 can return various decisions that are differentiated based on a value of a dissimilarity score (DS). For dissimilarity scores above or equal to the threshold $T_1$, indicating a high degree of dissimilarity manager system 110 in one embodiment can return the decisions A, B, and C, wherein A is the decision to auto-suppress a candidate related product from a set of determined related products and auto-suppress candidate related products from a set of related products for display on user interface 1700 and B is the decision to auto-update all product topic classification lists for all products (product of interest or candidate related products) subject to image analysis at blocks 5002 and/or 5006 and where in the decision C is the decision to send a notification to an administrator user, e.g. using administrator user interface 500 specifying the decision to suppress a candidate related product from a set of determined related products for display and the decision to update product topic classifications lists.

Further in accordance with the decision data structure of Table 1, manager system 110 in the case that a dissimilarity score (DS) between a compared product of interest and a candidate related product is moderate, e.g. as indicated by being greater than a second threshold $T_2$ but less than the threshold $T_1$ manager system 110 can return decisions D and E, wherein decision D is the decision to present a menu option to a user searching for a product of interest, e.g. using user interface 1700 to suppress a candidate related product and wherein E is the decision to present a menu option to an administrator user to add image analysis extracted product topic classifiers to product topic classifier lists (product of interest or candidate related product) subject to image analysis.

With further reference to the decision data structure of Table 1, manager system 110 in the case that a product of interest is similar to a candidate related product, e.g. where a dissimilarity score (DS) is less than the threshold $T_2$, manager system 110 can determine that the compared candidate product of interest is to be included in a determined product of interest and can perform no suppression of a candidate related product from a set of determined related products and can perform no updating of product topic classifier lists to include image analysis topic classifiers. In an alternative embodiment, manager system 110 based on a dissimilarity score (DS) being less than a threshold $T_2$, can present an administrator user, e.g. using administrator user interface 500 a menu option to add image analysis determined product topic classifiers to product topic classifier lists. Referring to user interface 1700 (FIG. 6), manager system 110 based on decision A being returned can suppress altogether the displayed content from area 1712. Referring to administrator user interface 500 based on decision C being returned, manager system 110 can display in area 522 of administrator user interface 500 the information that based on a dissimilarity score (DS) exceeding the threshold $T_1$ the image analysis extracted product topic classifiers of classification content 1802 (FIG. 8) and classification content 1902 (FIG. 9) have been added to topic classification lists of product records area 2121 of data repository 112.

Based on the decision D being returned manager system 110 can present a menu option prompt in area 1714 of user interface 1700 allowing a user searching for a product of interest to specify that a currently recommended product indicated in area 1712 be suppressed from a determined related product list. In one embodiment, manager system 110 clicking on area 1714 to suppress the recommended product of area 1712 can automatically update product topic classification lists of the product of interest and the candidate related product indicated in area 1712 to include image analysis extracted product topic classification extracted at blocks 5002 and/or 5006. Based on decision E being returned, manager system 110 referring to administrator user interface 500, can present in area 526 and/or area 528 menu options that can be exercised by an administrator user to add image analysis determined product topic classifications determined at block 5002 and/or block 5006 to current product topic classification lists for a product of interest and/or a candidate related product subject to comparing at block 5008 in product records area 2121. Manager system 110 can also display menu option area 526 and/or menu option area 528 in response to decision F being returned using a decision data structure according to the decision data structure set forth in Table 1.

According to one embodiment, decisions returned using a decision data structure as set forth in Table 1 can include additional features so that manager system 110 returns a minimal number of related products. Thus, in one implementation manager system 110 can be restricted from enforcing decision A to auto-suppress candidate related products from a set of related products for display on user interface 1700 on the condition the product is needed to satisfy a minimal number of related product return criterion. In one embodiment, manager system 110 can provide thresholds $T_1$ and $T_2$ to be in dependence on a minimal number of related product return criterion to assure return of the related products in accordance with the minimal number of related product return criterion.

Referring again to the flowchart of FIG. 4, manager system 110 on completion of examining block 1105 can proceed to block 1106 to provide one or more output. The one or more output can be in accordance with the identified outputs described with reference to block 5010 (FIG. 7) and can include one or more output to provide the actions described in reference to Table 1 in accordance with one or more of the decisions A, B, C, D, E, and/or F set forth in reference to the decision data structure of Table 1. In the case the one or more output includes a notification to an administrator user the notification can be received by an administrator client computer device 125 at block 1252. In the case the one or more output includes a notification to a user the notification can be received by a client computer device 130A at block 1302.

The exemplary decision data structure as set forth in Table 1 has specific threshold parameter values and is in dependence on scoring value including weight parameters of Eq. 1. In one embodiment, manager system 110 can run machine learning process 117 to iteratively update the decision data structure such as the decision data structure of Table 1 by machine learning. In one embodiment, manager system 110 can monitor performance of instances of a decision data structure. Performance can be monitored based on one or more criterion, e.g. number of generated additional clicks on displayed content of determined related products, purchases of determined related products, and the like. In one embodiment, a click of displayed content featuring a candidate related product suppressed with a first instance of decision structure active and not suppressed with a second instance of the decision data structure active can be used to negatively score performance of the first instance. In one embodiment, any click of displayed content featuring a candidate related product can be used to positively score the instance of the decision data structure driving the presented display of the related products.

Manager system 110 running machine learning process 117 in one embodiment can iteratively examine performance of manager system 110 across a distribution of instances, wherein each instance employs differently configured decision data structure (e.g. having differentiated parameter values) for driving a related product determination decision. Manager system 110 can be running a plurality of instances of blocks 5008 and 5010 for a plurality of user searches concurrently or successively. For each instance, manager system 110 can change parameter values shown in Eq. 1 and Table 1 within valid ranges to facilitate searching of optimum parameter values and manager system 110 by running machine learning process 117 can update the parameter values over the time so that the parameter values over time (as more sample data is accrued) converge toward values that are optimally performing parameter values. Based on a result of monitoring of different instances over time, manager system 110 running machine learning process 117 can bias the variety of the decision data structures employed, so that the decision data structures of decision data structures area 2122 assume the characteristics of the most successfully performing iterations.

Another feature that can be incorporated into system 100 is set forth with respect to administrator user interface 500 illustrated in FIG. 5. In one embodiment manager system 110 can provide user interface 500 to include an accelerator function that accelerates the population of keywords into area 510. Keywords entered into area 510 (normally by an administrator user) can be used as product topic classifiers and/or or processed by activation of NLP process 113 for extraction of product topic classifiers. User interface 500 can be provided so that for acceleration of text based keywords into keywords area 510, an administrator user can click on accelerator control 532 to activate image analysis process 116. Activation of image analysis process 116 can cause a one or more image selected using area 508 (which one or more image can be currently displayed on administrator user interface 500) to be subjected to image analyzes for extraction of content as depicted in FIGS. 8 and 9 and including one or more product topic classifiers. The text specifying the one or more extracted topic classifier can be auto-populated into area 510 for review by the administrator user who is using administrator user interface 500 to define product registration data. The administrator user can decide to remove the auto-populated one or more keyword by using an editing function of the administrator user interface. The administrator user can decide to not remove the auto-populated one or more keyword by not using an editing function of the administrator user interface. If the auto-populated one or more keyword is not removed, it will become part of a product data record stored in product records area 2121 on being sent at block 1251. The feature can facilitate rapid growth of a corpus of records into product records area 2121 of data repository. For example, for rapid definition of data records, an administrator user can select N images of a current product being subject to record definition using area 508. The administrator user can then use control 532 to activate image analysis process 116 and responsive to such activation several keyword terms specifying extracted product topic classifications extracted by the image analysis can be auto-populated into keywords area 510, which can auto-populated keywords (like all keywords of area 510) can be subject to editing by an administrator user using a manual editing function of administrator user interface 500.

Certain embodiments herein may offer various technical computing advantages involving computing advantages to address problems arising in the realm of computer networks. Embodiments herein can employ image analysis to improve accuracy and reliability of decision data structures for return of decisions. Embodiments herein involve computing advantages to address problems arising in the realm of computer networks such as problems involving user interfacing performed by computer networks in applications wherein inaccurate information or misalignment with a user's attention state can yield user disengagement and wasted and unnecessary computing resource expenditures. Embodiments herein recognize that interactions between a computer network and a user of the computer network are fundamental to the operation of the computer network. For example if information presented to a user is inaccurate or misaligned to a user's state of attention, the user can disengage from the network leading to a range of problems. Computing resources will be allocated to providing functions not utilized to deliriously effect efficiencies of other services provided. Computing resources may be unnecessary allocated to facilitate an unnecessary session termination process and additional computing resources to facilitate an unnecessary re-login process and an unnecessary re-authentication process. Embodiments herein recognize that a user interfacing with a computer network can be expected to disengage of presented with information that is inaccurate or misaligned to a current state of attention of a user, e.g., if a computers network's response to a user's initiated query is misaligned to a target of the user. Various decision data structures can be used to drive artificial intelligence (AI) decision making, such as decision data structures that cognitively maps dissimilarity scores to decisions that determine one or more output. Embodiments herein can feature artificial intelligence (AI) platforms that replicate aspects of human cognitive functioning e.g. by contemporaneous processing of text based and spatial image based inputs. Embodiments herein can include artificial intelligence (AI) processing platforms featuring improved processes to transform unstructured data into structured form permitting computer based analytics and predictive decision making. Embodiments herein can include particular arrangements for both collecting rich data into a data repository and additional particular arrangements for updating such data and for use of that data to drive artificial intelligence decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. employing Natural Language Processing (NLP) and decision data structure processing for transforming unstructured data into a form optimized for computerized processing.

Figure 10:
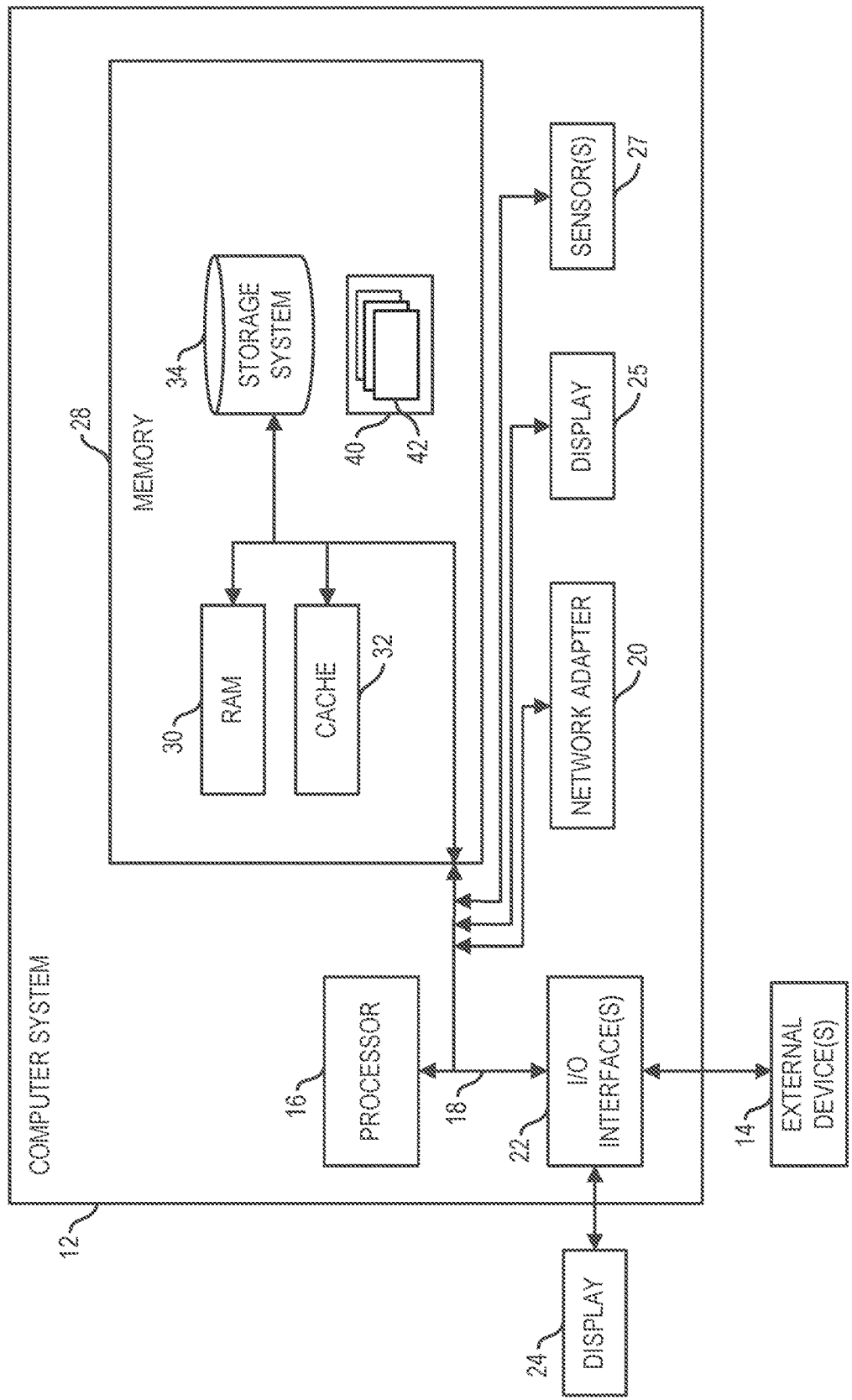
FIG. 10 depicts a computing node according to one embodiment.
Figure 11:
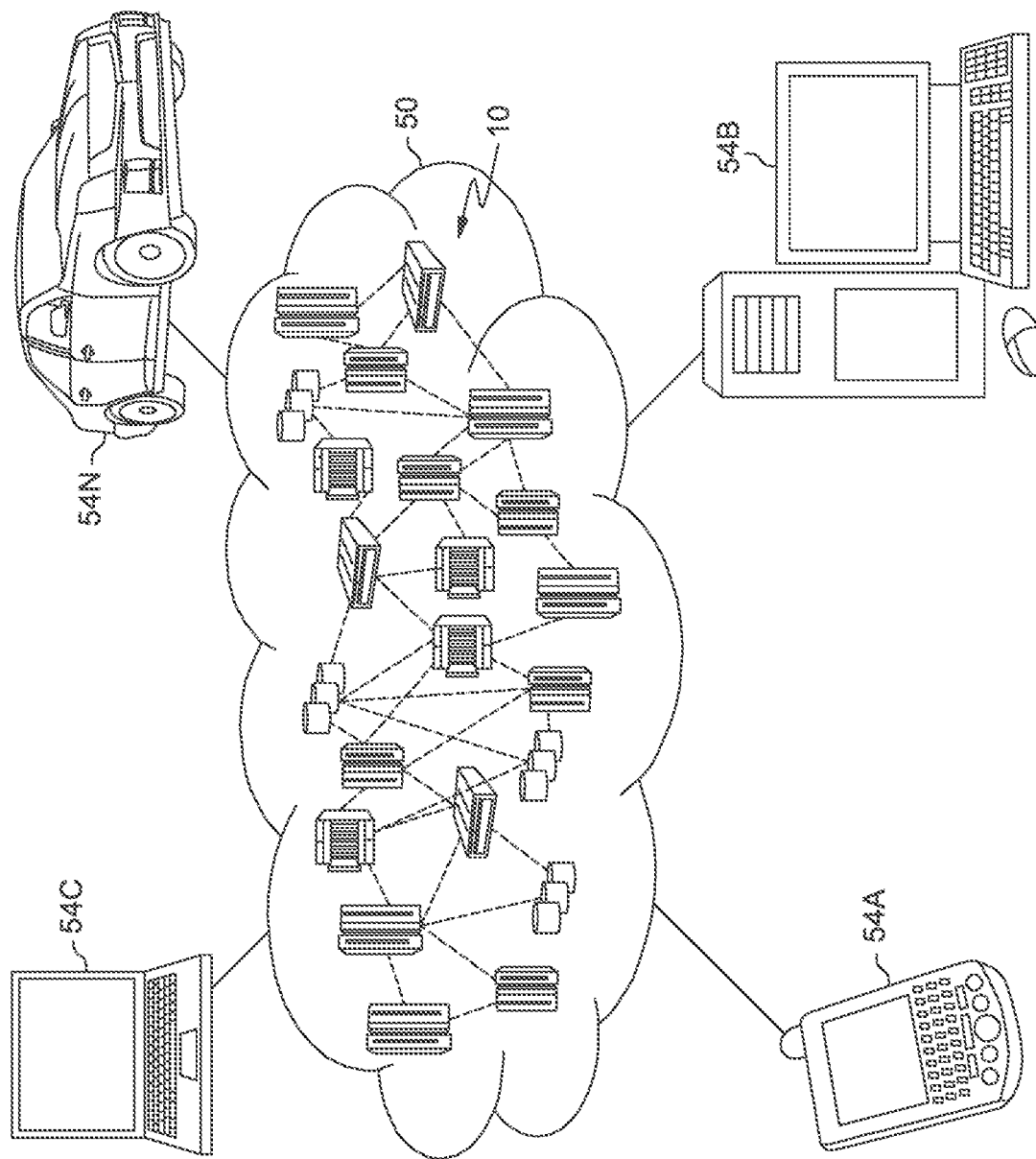
FIG. 11 depicts a cloud computing environment according to one embodiment.
Figure 12:
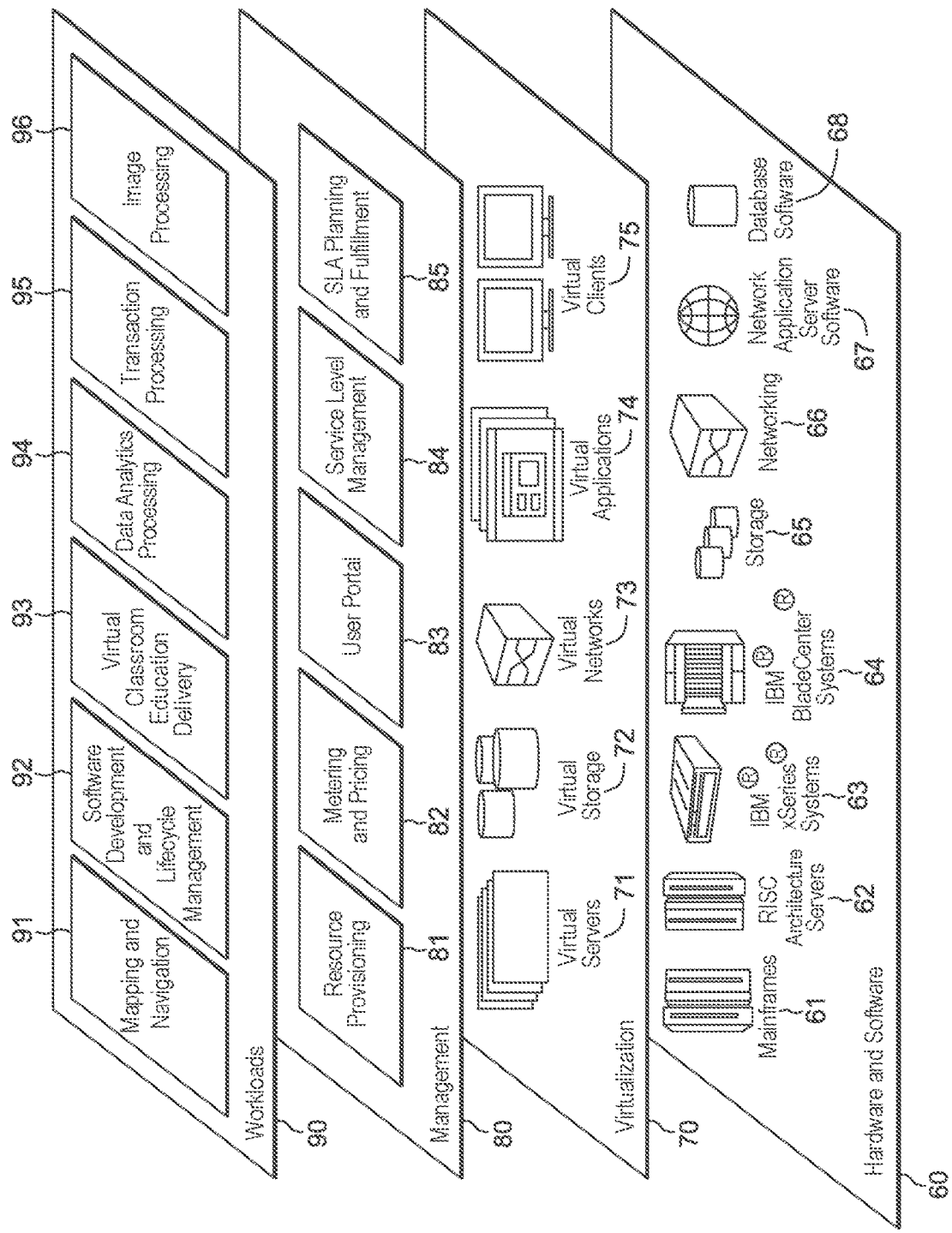
FIG. 12 depicts abstraction model layers according to one embodiment.

FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, one or more of client computer devices 130A-130Z can include one or more computing node 10 and can include one or more program 40 for performing functions described with reference to one or more user computer device 130A-130Z as set forth in the flowchart of FIG. 4. In one embodiment, one or more administrator client computer device 125 can include one or more computing node 10 and can include one or more program 40 for performing functions described with reference to administrator client computer device 125 as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing predictions of candidate geofence performance and related processes set forth herein. The processing components 96 can be implemented with use of one or more program 40 described in FIG. 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining from a user a data query, wherein the data query is a text based data query entered by the user;
   identifying a product of interest in response to the text based data query obtained from the user;
   examining a plurality of product records to determine a set of related products that are related to the product of interest, wherein the examining includes performing image analysis to extract one or more product topic classifier from product image data representing one or more product, wherein the performing image analysis includes subjecting a product image of the product of interest to image analysis to extract one or more product topic classifier of the product of interest; and
   providing one or more output in response to the examining, wherein the method includes identifying a candidate related product in response to the text based data query obtained from the user, wherein the performing image analysis includes subjecting a product image of the product of interest to image analysis to extract a first list of product topic classifiers associated the product of interest, and wherein the performing image analysis includes subjecting a product image of the candidate related product to image analysis to extract a second list of product topic classifiers associated to the candidate related product, wherein the method includes performing dissimilarity processing to determine a dissimilarity between the product of interest and the candidate related product, wherein the performing the dissimilarity processing includes discovering product topic classifiers of the first list that are not matched to a product topic classifier of the second list, and ascertaining product topic classifiers of the first list that are matched to a product topic classifier of the second list, and providing a dissimilarity score using the discovering and the ascertaining, wherein the examining a plurality of product records to determine a set of related products that are related to the product of interest comprises including the candidate related product in the set of related products based on the dissimilarity score being less than a threshold, and wherein the providing one or more output in response to the examining includes displaying the candidate related product to the user on a user interface of the user based on the dissimilarity score being less than the threshold.

2. The method of claim of 1, wherein the performing image analysis includes subjecting a product image of a second candidate related product for the product of interest to image analysis to extract one or more product topic classifier of the second candidate related product.

3. The method of claim of 1, wherein the performing image analysis includes subjecting a product image of the product of interest to image analysis to extract one or more first product topic classifier of the product of interest, and wherein the performing image analysis includes subjecting a product image of a second candidate related product for the product of interest to image analysis to extract one or more second product topic classifier of the second candidate related product, and wherein the examining includes comparing first data including the one or more first topic classifier to second data including the one or more second topic classifier, and the wherein the providing the one or more output in response to the examining includes excluding the second candidate related product from a determined set of related products based on the comparing indicating that a dissimilarity of the second candidate related product to the product of interest exceeds a threshold.

4. The method of claim of 1, wherein the identifying the product of interest in response to the one or more data query includes processing product records stored in a data repository, wherein the performing image analysis includes subjecting a product image of the product of interest to image analysis to extract one or more product topic classifier of the product of interest, and wherein the one or more output include updating the data repository so that a product of the data repository includes at least one of the one or more product topic classifier of the product of interest.

5. The method of claim 1, wherein the performing image analysis includes subjecting a product image of the product of interest to image analysis to extract one or more first product topic classifier of the product of interest, and wherein the performing image analysis includes subjecting a product image of a second candidate related product for the product of interest to image analysis to extract one or more second product topic classifier of a candidate related product, and wherein the examining includes producing a dissimilarity score using first data including the one or more first topic classifier and second data including the one or more second topic classifier, and wherein the providing the one or more output in response to the examining includes excluding the second candidate related product from a determined set of related products based on the dissimilarity score indicating that a dissimilarity of the second candidate related product to the product of interest exceeds a threshold.

6. The method of claim 1, wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing one or more output includes providing one or more output to perform a first action in response to the dissimilarity score having a first value, and wherein the providing one or more output includes providing one or more output to perform a second action in response to a second dissimilarity score having a second value.

7. The method of claim 1, wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing one or more output includes providing one or more output to perform a first action in response to the dissimilarity score having a first value, and wherein the providing one or more output includes providing one or more output to perform a second action in response to a second dissimilarity score having a second value, wherein the first action is displaying data of the candidate related product in a display area of a display featuring related products, wherein the second action is suppressing data of the candidate related product in a display area of the display featuring related products related to the product of interest.

8. The method of claim 1, wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing one or more output includes providing one or more output to perform a first action in response to the dissimilarity score having a first value, and wherein the providing one or more output includes providing one or more output to perform a second action in response to a second dissimilarity score having a second value, wherein the first action is presenting a user performing a product of interest search a menu option to suppress displaying data of the candidate related product in a display area of a display featuring related products, wherein the second action is presenting an administrator user who has added record data of the candidate related product into a data repository a menu option to add a product topic classifier extracted by image analysis of an image of the candidate related product into a data record for the candidate related product within the data repository.

9. The method of claim 1, wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing one or more output includes providing one or more output to perform a first action in response to the dissimilarity score having a first value, wherein the method includes monitoring performance of the dissimilarity score to decision mapping knowledgebase and updating parameter values of the dissimilarity score to decision mapping knowledgebase by machine learning based on the monitoring, wherein the monitoring includes monitoring of actions with respect to webpage content produced using the dissimilarity score to decision mapping knowledgebase.

10. The method of claim 1, wherein the method includes providing the plurality of product records using a displayed administrator user interface that has an image selection area to facilitate selection of one or more image of a product by an administrator user, and also includes a keyword area configured to facilitate entry of keyword text by the administrator user, wherein the administrator user interface is configured to permit the administrator user to activate an image analysis process wherein a selected one or more image of a product by the administrator user selected using the image selection area is subject to image analysis to extract one or more product classifiers of a product represented in the selected one or more image, and wherein responsively to activation of the image analysis process by the administrator user auto-populated text specifying the one or more extracted product classifiers is auto-populated into the keyword area in a form that permits editing of the auto-populated text by the administrator user.

11. A computer program product comprising:
   a computer readable storage medium readable by one or more processing circuit and storing instructions for execution by one or more processor for performing a method comprising:
     obtaining from a user a data query, wherein the data query is a text based data query entered by the user;
     identifying a product of interest in response to the text based data query obtained from the user;
     examining a plurality of product records to determine a set of related products that are related to the product of interest, wherein the examining includes performing image analysis to extract one or more product topic classifier from product image data representing one or more product, wherein the performing image analysis includes subjecting a product image of the product of interest to image analysis to extract one or more product topic classifier of the product of interest; and providing one or more output in response to the examining, wherein the method includes identifying a candidate related product in response to the text based data query obtained from the user, wherein the performing image analysis includes subjecting a product image of the product of interest to image analysis to extract a first list of product topic classifiers associated the product of interest, and wherein the performing image analysis includes subjecting a product image of the candidate related product to image analysis to extract a second list of product topic classifiers associated to the candidate related product, wherein the method includes performing dissimilarity processing to determine a dissimilarity between the product of interest and the candidate related product, wherein the performing the dissimilarity processing includes discovering product topic classifiers of the first list that are not matched to a product topic classifier of the second list, and ascertaining product topic classifiers of the first list that are matched to a product topic classifier of the second list, and providing a dissimilarity score using the discovering and the ascertaining, wherein the examining a plurality of product records to determine a set of related products that are related to the product of interest comprises including the candidate related product in the set of related products based on the dissimilarity score being less than a threshold, and wherein the providing one or more output in response to the examining includes displaying the candidate related product to the user on a user interface of the user based on the dissimilarity score being less than the threshold.

12. The computer program product of claim 11, wherein the performing image analysis includes subjecting a product image of a second candidate related product for the product of interest to image analysis to extract one or more product topic classifier of the second candidate related product.

13. The computer program product of claim 11, wherein the performing image analysis includes subjecting a product image of the product of interest to image analysis to extract one or more first product topic classifier of the product of interest, and wherein the performing image analysis includes subjecting a product image of a second candidate related product for the product of interest to image analysis to extract one or more second product topic classifier of the second candidate related product, and wherein the examining includes comparing first data including the one or more first topic classifier to second data including the one or more second topic classifier, and wherein the providing the one or more output in response to the examining includes excluding the candidate related product from a determined set of related products based on the comparing indicating that a dissimilarity of the candidate related product to the product of interest exceeds a threshold.

14. The computer program product of claim 11, wherein the plurality of records are stored in a data repository and wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing one or more output includes providing one or more output to perform a first action in response to the dissimilarity score having a first value, and wherein the providing one or more output includes providing one or more output to perform a second action in response to a second dissimilarity score having a second value, wherein the first action is presenting a user performing a product of interest search a menu option to suppress displaying data of the candidate related product in a display area of a display featuring related products, wherein the second action is presenting an administrator user who has added record data of the candidate related product into the data repository a menu option to add a product topic classifier extracted by image analysis of an image of the candidate related product into a data record for the candidate related product within the data repository, wherein the method includes providing the plurality of product records using a displayed administrator user interface that has an image selection area to facilitate selection of one or more image of a product by the administrator user, and also includes a keyword area configured to facilitate entry of keyword text by the administrator user, wherein the administrator user interface is configured to permit the administrator user to activate an image analysis process wherein a selected one or more image of a product by the administrator user selected using the image selection area is subject to image analysis to extract one or more product classifiers of a product represented in the selected one or more image, and wherein responsively to activation of the image analysis process by the administrator user auto-populated text specifying the one or more extracted product classifiers is auto-populated into the keyword area in a form that permits editing of the auto-populated text by the administrator user.

15. The computer program product of claim 11, wherein the plurality of records are stored in a data repository and wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing one or more output includes providing the one or more output to perform a first action in response to the dissimilarity score having a first value, and wherein the providing the one or more output includes providing one or more output to perform a second action in response to a second dissimilarity score having a second value, wherein the first action is presenting a user performing a product of interest search a menu option to suppress displaying data of the candidate related product in a display area of a display featuring related products, wherein the second action is presenting an administrator user who has added record data of the candidate related product into the data repository a menu option to add a product topic classifier extracted by image analysis of an image of the candidate related product into a data record for the candidate related product of within the data repository, wherein the method includes providing the plurality of product records using a displayed administrator user interface that has an image selection area to facilitate selection of one or more image of a product by the administrator user, and also includes a keyword area configured to facilitate entry of keyword text by the administrator user, wherein the administrator user interface is configured to permit the administrator user to activate an image analysis process wherein a selected one or more image of a product by the administrator user selected using the image selection area is subject to image analysis to extract one or more product classifiers of a product represented in the selected one or more image, and wherein responsively to activation of the image analysis process by the administrator user auto-populated text specifying the one or more extracted product classifiers is auto-populated into the keyword area in a form that permits editing of the auto-populated text by the administrator user, wherein the providing the one or more output in response to the examining includes using a dissimilarity score to decision mapping knowledgebase that maps product of interest to candidate related product dissimilarity scores to decisions associated to the product of interest to candidate related product dissimilarity scores, wherein the providing the one or more output includes providing the one or more output to perform a first action in response to the dissimilarity score having a first value, wherein the method includes monitoring performance of the dissimilarity score to decision mapping knowledgebase and updating parameter values of the dissimilarity score to decision mapping knowledgebase by machine learning based on the monitoring, wherein the monitoring includes monitoring of actions with respect to webpage content produced using the dissimilarity score to decision mapping knowledgebase.

16. A system comprising:
a memory;
at least one processor in communication with the memory; and
program instructions executable by one or more processor via the memory to perform a method comprising:
obtaining from user a data query, wherein the data query is a text based data query entered by the user;
identifying a product of interest in response to the text based data query obtained from the user;
examining a plurality of product records to determine a set of related products that are related to the product of interest, wherein the examining includes performing image analysis to extract one or more product topic classifier from product image data representing one or more product, wherein the performing image analysis includes subjecting a product image of the product of interest to image analysis to extract one or more product topic classifier of the product of interest; and
providing one or more output in response to the examining, wherein the method includes identifying a candidate related product in response to the text based data query obtained from the user, wherein the performing image analysis includes subjecting a product image of the product of interest to image analysis to extract a first list of product topic classifiers associated the product of interest, and wherein the performing image analysis includes subjecting a product image of the candidate related product to image analysis to extract a second list of product topic classifiers associated to the candidate related product, wherein the method includes performing dissimilarity processing to determine a dissimilarity between the product of interest and the candidate related product, wherein the performing the dissimilarity processing includes discovering product topic classifiers of the first list that are not matched to a product topic classifier of the second list, and ascertaining product topic classifiers of the first list that are matched to a product topic classifier of the second list, and providing a dissimilarity score using the discovering and the ascertaining, wherein the examining a plurality of product records to determine a set of related products that are related to the product of interest comprises including the candidate related product in the set of related products based on the dissimilarity score being less than a threshold, and wherein the providing one or more output in response to the examining includes displaying the candidate related product to the user on a user interface of the user based on the dissimilarity score being less than the threshold.

17. The system of claim of 16, wherein the method includes identifying a second candidate related product in response to the text based data query obtained from the user, wherein the performing image analysis includes subjecting a product image of the product of interest to image analysis to extract one or more first product topic classifier of the product of interest, and wherein the performing image analysis includes subjecting a product image of the second candidate related product for the product of interest to image analysis to extract one or more second product topic classifier of the second candidate related product, and wherein the examining includes comparing first data including the one or more first topic classifier to second data including the one or more second topic classifier, and wherein the providing the one or more output in response to the examining includes excluding the candidate related product from a determined set of related products based on the comparing indicating that a dissimilarity of the candidate related product to the product of interest exceeds a threshold.

* * * * *